March 16, 1943. L. I. YEOMANS 2,314,183
METHOD OF MACHINING METAL BLANKS
Filed June 26, 1940
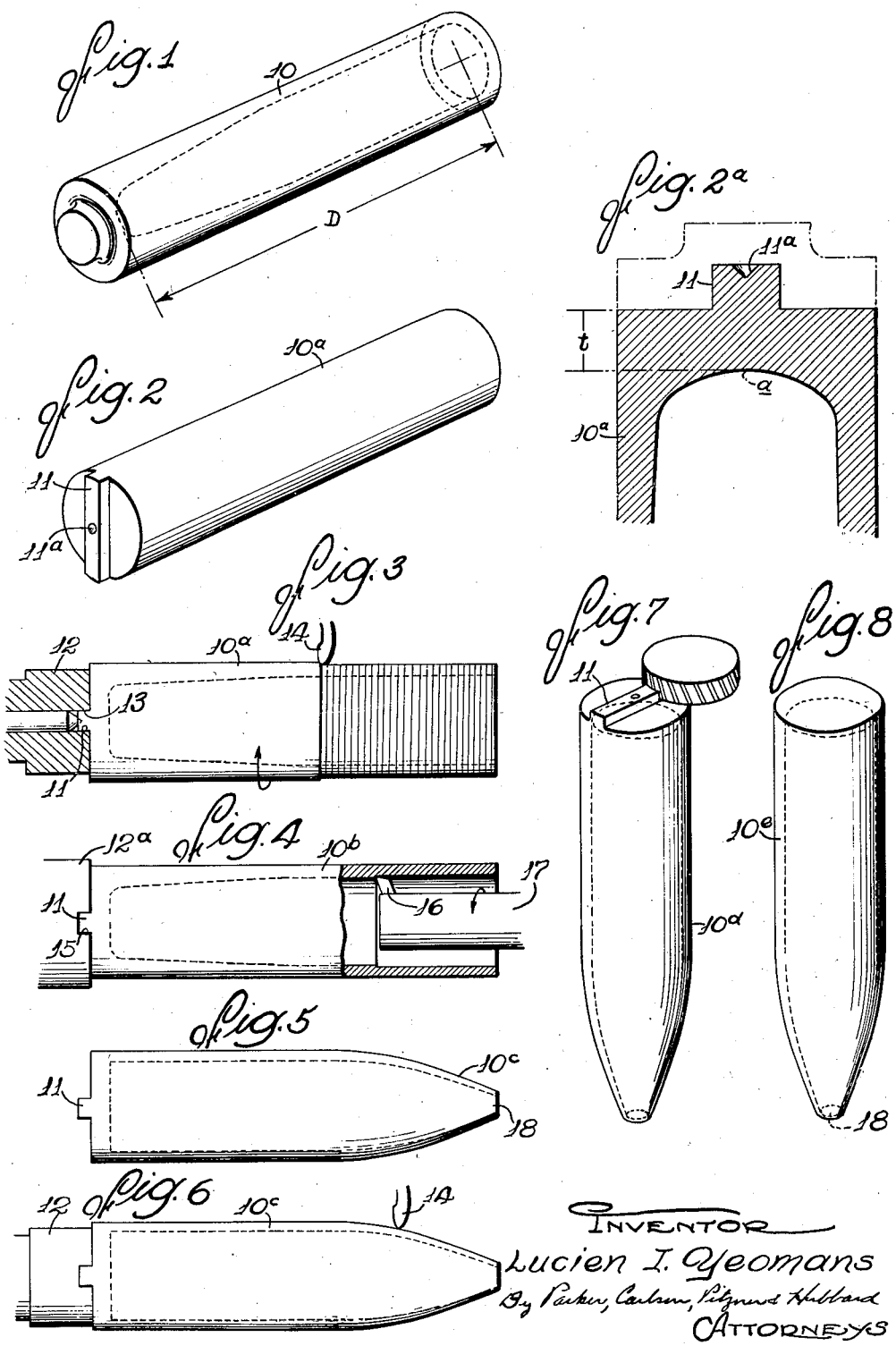
INVENTOR
Lucien I. Yeomans
By Parker, Carlson, Pigneret Hubbard
ATTORNEYS Patented Mar. 16, 1943

2,314,183

UNITED STATES PATENT OFFICE 2,314,183

METHOD OF MACHINING METAL BLANKS

Lucien I. Yeomans, Chicago, Ill., assignor of one-half to George F. Bryant, Chicago, Ill.

Application June 26, 1940, Serial No. 342,436

2 Claims. (Cl. 29—1.21)

The invention relates to a method of preparing for machining, and of machining, metal blanks, and more particularly blanks for artillery shells.

The principal aim of the present invention is to accomplish the machining of metal blanks for artillery shells which are of tubular shape in such manner that the torsional strain incident to such machining need not to be borne simply by a frictional grip type chuck as has heretofore been the practice. Instead, this torsion is, in accordance with the present invention, transmitted through a chuck element fashioned rigidly with the blank and shaped to be received and positively locked in a complemental chuck element on the machine. In this way costly tool breakage and workpiece spoilage, heretofore particularly prevalent in rough-turning or boring where heavy torsion is applied due to the deep cuts taken, are obviated.

More particularly, it is an object of the invention to provide a novel method of fashioning artillery shells from forged cup shaped metal blanks such that the torsion incident to turning and boring is borne by an integral chuck element milled on the closed end of the blank and, as an incident to the formation of the chuck element, this closed end of the blank is also trimmed to a predetermined thickness required in the finished shell and establishing a plane base surface at a predetermined distance from the end of the cavity within the blank, which may serve as a base and gauge point for correctly nosing the shell after the initial turning.

Further objects and advantages of the invention will become apparent as the following description proceeds, taken in connection with the accompanying drawing in which:

Figure 1 is a perspective view of a raw metal artillery shell blank prior to its machining in accordance with the herein disclosed novel method.

Fig. 2 is a perspective view of the blank after its end has been shaped to form an integral chuck element on it.

Fig. 2a is an enlarged fragmentary sectional view along the line 2a—2a in Fig. 2.

Fig. 3 is a side elevation showing generally diagrammatically the rough turning of the blank.

Fig. 4 is a side elevation partially in section showing generally diagrammatically the rough-boring of the blank.

Fig. 5 shows the rough-turned and bored blank after its nose has been pointed.

Fig. 6 is a side elevation showing generally diagrammatically the finish-turning of the pointed blank.

Fig. 7 is a perspective view of the blank showing the removal of the chuck element initially formed on it.

Fig. 8 is a perspective view of the finished blank.

The general sequence of steps in the exemplary use of the present invention will be apparent upon consideration, in order, of Figs. 1 to 8 in the accompanying drawing, Fig. 2a being, incidentally, a supplementary figure to amplify the showing of the chuck element on the blank of Fig. 2. Although I have described in some detail a preferred mode of employment of my novel method of machining artillery shell blanks, it should be understood, however, that I intend to cover all alternative or modified methods falling within the spirit and scope of the invention as expressed in the appended claims.

Turning now to the details of the exemplary use of the method, it has been disclosed as applied to the machining of raw blanks, like the blank 10 in Fig. 1, to form a finished artillery shell of the form of the shell 10e in Fig. 8. The raw blank 10 is customarily a steel forging and, as will be seen in Fig. 1, is of cup shape. The depth D of the cavity in the blank has been previously predetermined by trimming the edges of the blank at its open end a necessary amount as, for example, in a trimming machine of the form shown in my copending application Serial No. 332,140 filed April 29, 1940.

In accordance with one aspect of my present invention, the blank 10 is prepared for subsequent turning and boring operations by fashioning on it a rigid chuck element which is shaped to interlock with a complemental chuck element in the boring or turning machine. In this way a positive lock is afforded in the chuck for transmitting the torsional strains incident to turning or boring, as distinguished from using simply a frictionally gripping chuck as has heretofore been the practice. As a result, slippage of the workpiece in the chuck is completely obviated as is the breakage of expensive cutting tools and spoilage of blanks which results from any such slippage.

In the present instance the chuck element, rigid with the blank, is fashioned in the form of an integral rib 11 (Figs. 2 and 2a) extending diametrically across the outer face of the closed end of the blank. It will be observed that this rib presents flat lateral faces extending along chords of the circular end of the blank. These lateral faces constitute abutment shoulders or faces against which complemental abutments on a chuck element in the turning or boring machine, may be seated to transmit the torsion forces impressed on the blank as an incident to turning or boring.

The rib 11 may be fashioned in any suitable manner as, for example, by milling off the excess metal, the outlines of which are indicated in dot-dash lines in Fig. 2a, to obtain the desired ribbed contour on the end of the blank. A machine tool especially adapted to machine blanks of the character indicated, to form such a chuck element on them, is described and claimed in the copending application of George F. Bryant, Serial No. 342,479 filed June 26, 1940, and now issued as Patent No. 2,251,034.

Upon completion of the rib, a lathe center recess 11a is fashioned in the top of the rib 11, at a point carefully alined with the longitudinal center line of the cavity within the blank.

Not only is a chuck element or rib 11 milled on the end of the blank, but, at the same time its closed end is thinned to a predetermined thickness t indicated in Fig. 2a. For this purpose the blank may be supported on a mandrel (not shown) inserted into the same and contacting the bottom of its cavity at point a (Fig. 2a). The milling cutters, which machine the end of the blank, are located at a fixed distance t from the point a at the nose of the mandrel so that in surfacing the end of the blank its end wall is thinned to this predetermined thickness t. This thickness t of the closed end wall for the blank is substantially that which will be required at the butt end of the finished shell. Thinning the end wall in the manner described by external machining very much reduces the cost of this operation as distinguished from removing the excess metal from the interior of the blank. It will be appreciated that since the blanks are initially formed by forging the thicknesses of the closed ends will vary considerably in successive blanks and, accordingly, it is necessary in one way or another to machine them to a predetermined thickness. In addition, the thinning of the end of the blank to the thickness t, as described, serves to establish a plane base surface at a predetermined distance from the adjacent inner end of the cavity within the blank, which surface serves as a base and gauge point for correctly nosing the shell after its initial turning.

Having formed the ribbed blank 10a as described above, it is chucked up in a turning machine as indicated more or less schematically in Fig. 3. Thus, the rib or chuck element 11 is engaged by a chuck element 12 of a lathe or other suitable turning machine, which may be of well known form, the chuck element 12 having, however, a transverse groove 13 in its face which is complemental to the rib 11 and which receives the same. A lathe center point in the root of the groove 13, and alined with the axis of rotation of the chuck element 12, is, of course, inserted into the lathe center recess 11a. Accordingly, the blank 10a may be revolved by power rotation of the machine chuck 12 and a roughing cut on the exterior of the blank taken by a tool 14. The heavy torsional strain on the blank 10a, incident to taking this deep roughing cut is effectually transmitted through the positively interlocked chuck elements 11, 12 so that there is no possibility of workpiece slippage with consequent tool breakage and workpiece spoilage.

The interior of the rough-turned blank 10b may be roughed out in a similar manner as indicated in Fig. 4. Of course, either the interior or exterior roughing cut may be taken first. For the boring operation, the chuck element 11 is engaged with a chuck element 12a in the boring machine and which has a groove 15 in its front face complemental to, and fitting snugly about, the rib 11. This chuck element 12a also has a center point or projection (not shown) in the root of the groove 15 which is inserted into the center recess 11a in the blank. In this instance the machine chuck element 12a may be stationary and the boring accomplished by a boring tool 16 on the end of a power rotated boring bar 17 inserted into the turned blank 10b. Again, even the heavy torsional strains incident to rough boring are effectually transmitted through to the positively interlocked chuck elements 11, 12a. If desired, secondary or intermediate roughing cuts may be taken by turning or boring or both in the same general manner described above for the initial roughing cuts.

The rough-machined blank 10b next has its open end portion drawn or nosed, by a suitable well known forging operation or the like, to pointed form so as to constitute a pointed blank 10c of the general shape indicated in Fig. 5. As noted above, the dimensional location of the pointed nose portion of the shell may be accurately determined by using the milled butt end surface of the shell as a reference or gauge point. As is customary, a small opening 18 is left in the nose of the pointed blank 10c through which it is subsequently charged with explosive, this opening being tapped and a fuse finally screwed in place.

Finish turning of the pointed blank 10c is next in order after the nose drawing operation. For this purpose (see Fig. 6) the blank's chuck element 11 is again engaged by the complemental chuck element 12 of a lathe or other turning machine, as explained in relation to Fig. 3 above. In the present instance, however, the turning tool 14 is, of course, set to take a much lighter finishing cut.

After the various turning and boring operations have been completed, for completely machining the side walls of the blank, the temporary chuck element or rib 11 may be removed from the finish machined blank 10d (see Fig. 7). For this purpose rib 11 may be removed in any suitable manner as, for example, by milling it off, as indicated in Fig. 7. Such removal of the rib 11 leaves the completed artillery shell blank 10e (Fig. 8) which is now ready for charging and installation of its fuse.

I claim as my invention:

1. The method of forming artillery shells, which comprises, fashioning on the exterior of the closed end of a generally cup shaped forged metal blank an integral chuck element projecting from such end of the blank, engaging said chuck element with a complementally shaped chuck element through which torsion is transmitted as an incident to turning and boring the blank, rough turning the exterior of the blank and rough boring its interior while so chucked, drawing the open end of the blank to pointed form, finish turning the exterior of the blank while so chucked, and finally trimming off said integral chuck element.

2. The method of forming artillery shells, which comprises, milling the closed end of a generally cup shaped forged metal blank to form an integral transverse exterior rib across said end of the blank and as an incident to the milling of such rib thinning the end wall of the blank to predetermined thickness, engaging said rib with a complementary shaped chuck element through which torsion is transmitted as an incident to turning and boring the blank, rough turning the exterior of the blank and rough boring its interior while so chucked, drawing the open end of the blank to pointed form, finish turning the exterior of the blank while so chucked, and finally trimming off said integral rib.

LUCIEN I. YEOMANS.